United States Patent [19]

Brown et al.

[11] Patent Number: 4,724,019
[45] Date of Patent: Feb. 9, 1988

[54] METHOD AND APPARATUS FOR SEALING CAPSULES

[75] Inventors: Charles F. Brown, Joanna; Jean C. Lebrun, Greenwood, both of S.C.

[73] Assignee: Warner-Lambert Company, Morris Plains, N.J.

[21] Appl. No.: 28,632

[22] Filed: Mar. 20, 1987

[51] Int. Cl.⁴ .............................................. C09J 5/00
[52] U.S. Cl. ...................................... 156/69; 53/485; 118/20; 118/25; 156/294; 156/305; 156/381; 156/578; 206/530; 209/543; 209/906; 427/3
[58] Field of Search ................... 53/282, 485; 118/19, 118/20, 24, 25, 303; 156/69, 305, 294, 381, 578; 206/530; 209/543, 644, 906; 427/3

[56] References Cited

U.S. PATENT DOCUMENTS

| | | | |
|---|---|---|---|
| 3,911,860 | 10/1975 | Nohynek | 118/25 |
| 4,532,881 | 8/1985 | Sakashita et al. | 118/20 |
| 4,539,060 | 9/1985 | Wittwer et al. | 156/69 X |
| 4,543,906 | 10/1985 | Glatt et al. | 118/20 X |
| 4,548,825 | 10/1985 | Voss et al. | 118/25 X |
| 4,649,855 | 3/1987 | Preis | 118/19 |
| 4,656,056 | 4/1987 | Levenberger | 118/303 X |
| 4,656,066 | 4/1987 | Wittwer | 156/69 X |

Primary Examiner—Robert A. Dawson
Attorney, Agent, or Firm—Howard Olevsky; Stephen Raines

[57] ABSTRACT

Improved method and apparatus for use in sealing gelatin capsules filled with medicinal ingredients wherein each capsule has a generally cylindrical cap and body arranged with the side wall of the body telescopically within the side wall of the cap to contain the medicament therein comprising an economical and compact wetting device for automatically conveying filled capsules from a capsule-filling machine by pneumatic pressure conveyance through one or more passageways to a wetting location where each capsule is maintained in a generally cap-upright position and metered amounts of a wetting liquid are applied to side wall portions of the body of the capsule adjacent the seam of the cap and body to pass by capillary action into the space between the overlapping cap and body side walls, and the capsules are released from wetting positions in the passageways for further pneumatic conveyance to a point of heat treatment for final sealing of the body and cap portions of the capsule to prevent their separation and facilitate tamper-resistance of the capsules before use.

15 Claims, 11 Drawing Figures

METHOD AND APPARATUS FOR SEALING CAPSULES

The present invention is directed to method and apparatus for sealing capsules containing medicaments, and more particularly, to an improved method and apparatus for sealing the cap and body portions of medicament-containing gelatin capsules to improve medicament retention, capsule security, and tamper-resistance.

BACKGROUND OF THE INVENTION

Pharmaceutical compositions and medicaments typically are orally ingested in liquid, tablet, and capsule form. The gelatin capsule is a solid, oral dosage form of medicament generally consisting of two prefabricated cylindrical shells (a cap and a body), one end of each of which is rounded and closed, and the other end of which is open. A medicament or medicaments, usually in paste, liquid, or powder, are filled into the body which is then joined with a cap in order to close the capsule.

Historically, the hard gelatin capsule form of medication has been considered a preferred dosage form since patients perceive them as having no aftertaste, being easy to swallow, causing no indigestion, and working quickly. Although the gelatin capsule is a highly effective form of solid oral dosage for medications, recent events have focused attention on their security and tamper-resistance.

The standard gelatin capsule in which the smooth side wall of the body of the capsule is telescopically received within the smooth cylindrical side wall of the cap can be easily reopened after filling. One solution to prevent reopening after filling is to band the joined cap and body of each capsule at their seam of overlap with a gelatin band or film. This requires contact of each capsule by a liquid gelatin-coated roller to apply the band thereto, involves a time-consuming operation and costly apparatus, and is generally incompatible with high-speed capsule-filling machine operations.

As an alternative to capsule-banding to secure the cap and body portions, the smooth side walls of the cap and body of capsules have been shape-modified by provision of mating circular grooves and ridges to achieve a snap-fit securement of the cap and body to resist re-opening after joining. Capsules having structurally-modified cap and body wall configurations are commercially available and sold by Capsugel Division of Warner Lambert Corporation under the trademarks Snap-Fit TM, Coni-Snap TM, and Coni-Snap Supro TM.

While shape-modified cap and body structures which provide snap-fit securement greatly reduce splitting and denting effects during capsule joining, and make capsules more difficult to open after joining, tamper-resistance and security of capsules may be further improved by sealing the caps to the bodies after filling. Various techniques have been employed in sealing hard gelatin capsules, such as immersion of the capsules in a liquid sealing composition, specific application of a sealing composition to the capsule, cap spraying, mechanical thermal welding, gelatin banding, and through-hole spraying.

The most effective sealing of capsules is believed achieved by using a sealing fluid that results in a one-piece gelatin capsule. One commercially-available method for sealing hard gelatin capsules so that they cannot be opened without visible destruction is known as the Licaps TM sealing process developed by Capsugel. The Licaps TM process involves wetting the wall contact areas between the cap and body with a special melting-point-lowering liquid. After removal of the excess wetting liquid from the capsule, the sections are then thermally bonded into one unit. To obtain a homogeneous seal, it is important that the wall contact areas be exposed uniformly to the wetting liquid, which is achieved through capillary action, causing the wetting liquid to be drawn into the area between the overlapping walls of the cap and body of the capsule.

The wetting liquids are believed to act to dissolve the amorphous part of the gelatin between the overlap of the cap side walls over the body side walls of the capsules by lowering the glass transition temperature of the gelatin. Furthermore, the sealing or wetting liquids may depress the melting point of the crystalline part of the gelatin. Such wetting liquids must be readily ingestible, available, affect a lowering of the gelatin melting point, and have a small contact angle with the capsule walls to promote high capillary action. A number of such wetting liquids and their methods of application to capsules are disclosed and described in U.S. Pat. No. 4,539,060 to Wittwer et al. and in co-pending U.S. patent application Ser. No. 06/582,364 filed Feb. 22, 1984 now U.S. Pat. No. 4,656,066, both commonly-assigned with the present application. A highly suitable wetting liquid is a mixture of water and an alcohol, such as ethanol, two solvents which are frequently and commonly used in the manufacture of pharmaceutical products. The selection of the ratio of the liquid components of the wetting liquid depends upon the composition of the capsule wall (degree of moisture, presence of additives, such as dyes and pigments), the type of printing on the capsule, and the temperature during application of thermal energy. The disclosures of aforesaid U.S. Pat. Nos. 4,539,060 and 4,656,066 are incorporated herein by reference.

The Licaps TM capsule-sealing process is a three-step method involving a first liquid-contacting phase in which filled and closed gelatin capsules are brought into contact for a brief period of time with the wetting liquid, which is immediately distributed through capillary action into the area between the overlapping walls of the caps and bodies.

In the second step, or phase, excess wetting liquid is removed from the exposed outer walls of the conveyed capsules by mechanically draining and air-drying. The overlapping gelatin wall sections remain moist which causes the walls to swell, resulting in a homogeneous, though preliminary, seal between the cap and body.

In the third step, or phase, final and complete sealing is achieved by application of the specific amount of thermal energy to effect sealing.

Apparatus designed for practice of the Licaps TM sealing process consists of a sealing machine which may be linked by conveyor to receive filled capsules directly from a capsule-filling machine. The sealing machine comprises a rotating conical wire-mesh basket in which a wetting liquid is sprayed onto the entire outer surface of capsules as they are continuously fed therethrough. Capillary action causes transfer of some of the wetting liquid to the area between the overlapping walls of the cap and body of each capsule. The excess wetting liquid is removed from the capsules as they approach the exit end of the basket both by mechanical drainage and application of room-temperature air. From the liquid applicator basket, the capsules are directed alternately, in batch-wise manner, into one of two drying and sealing chambers which are in the form of fluidized beds. Since two chambers are available, the sealing machine operates to fill the chambers in alternating fashion, so that conditioned cool air is first passed through each chamber during capsule-filling to further dry the capsules, while heated air is thereafter passed through each chamber after it is filled to thermally seal the capsules. The excess wetting liquid, generally comprising a mixture of water and alcohol, which is removed from the capsules by drainage and evaporation, is eventually collected and processed by special recovery equipment to meet environmental regulations and requirements for disposal.

Although the Licaps TM capsule-sealing process and apparatus, as described, provides an effective method and means to produce a one-piece capsule which may not be separated without destruction, it does require rather specialized equipment for conveying, spraying, handling, treating, and initially drying the capsules which involves a considerable capital investment. Further, the application of a wetting liquid to the entire capsule outer body surface involves use of excess chemicals and additional costs in the necessary equipment to collect and dispose of the excess wetting chemicals to meet environmental standards and regulations.

In the aforementioned U.S. Pat. Nos. 4,539,060 and 4,656,066, it has been suggested that wetting liquids of the type described might be applied locally to seam areas of gelatin capsules for migration between the overlapping cap and body by delivering metered quantities of the wetting liquid by high-frequency pulsation of jets or nozzles.

BRIEF OBJECTS OF THE PRESENT INVENTION

It is an object of the present invention to provide an improved method of sealing hard gelatin capsules containing medicaments and pharmaceutical compositions by controlled application of small, metered amounts of a wetting fluid between the overlapping side walls of the cap and body of the capsules to produce a one-piece capsule which cannot be opened without destruction of the capsule body or cap.

It is another object of the present invention to provide improved automated apparatus used in sealing hard gelatin capsules containing a medicament by application of metered amounts of a wetting fluid to fuse overlapping wall area of the cap and body of the capsules to effectively seal the same against removal.

It is yet another object to provide improved economical and compact apparatus for effectively sealing the cap and body of a gelatin capsule to prevent their removal and to ensure positive retention of medicaments in solid, powder, liquid, granule, and other form therein.

It is still another object to provide improved apparatus for direct attachment to and operation in sequence from a capsule-filling machine whereby filled capsules containing medicaments leaving the machine are automatically conveyed and transported to points of automated application of small, metered amounts of wetting liquid to selected surface areas of the capsules immediately adjacent the seam of the overlapping side walls of the cap and body, permitting minimum use of wetting liquid for capillary movement into the wall overlap areas, eliminating need of use of excess wetting liquid and special recovery and handling equipment for excess liquid in the sealing operation.

It is a further object to provide improved apparatus for sealing of medicinal capsules to improve their security and tamper-resistance, which is of economical construction, and may be employed directly in operation with a capsule-filling machine or other filled capsule delivery system, such as a hopper feed device.

BRIEF SUMMARY OF THE INVENTION

Figure 1:
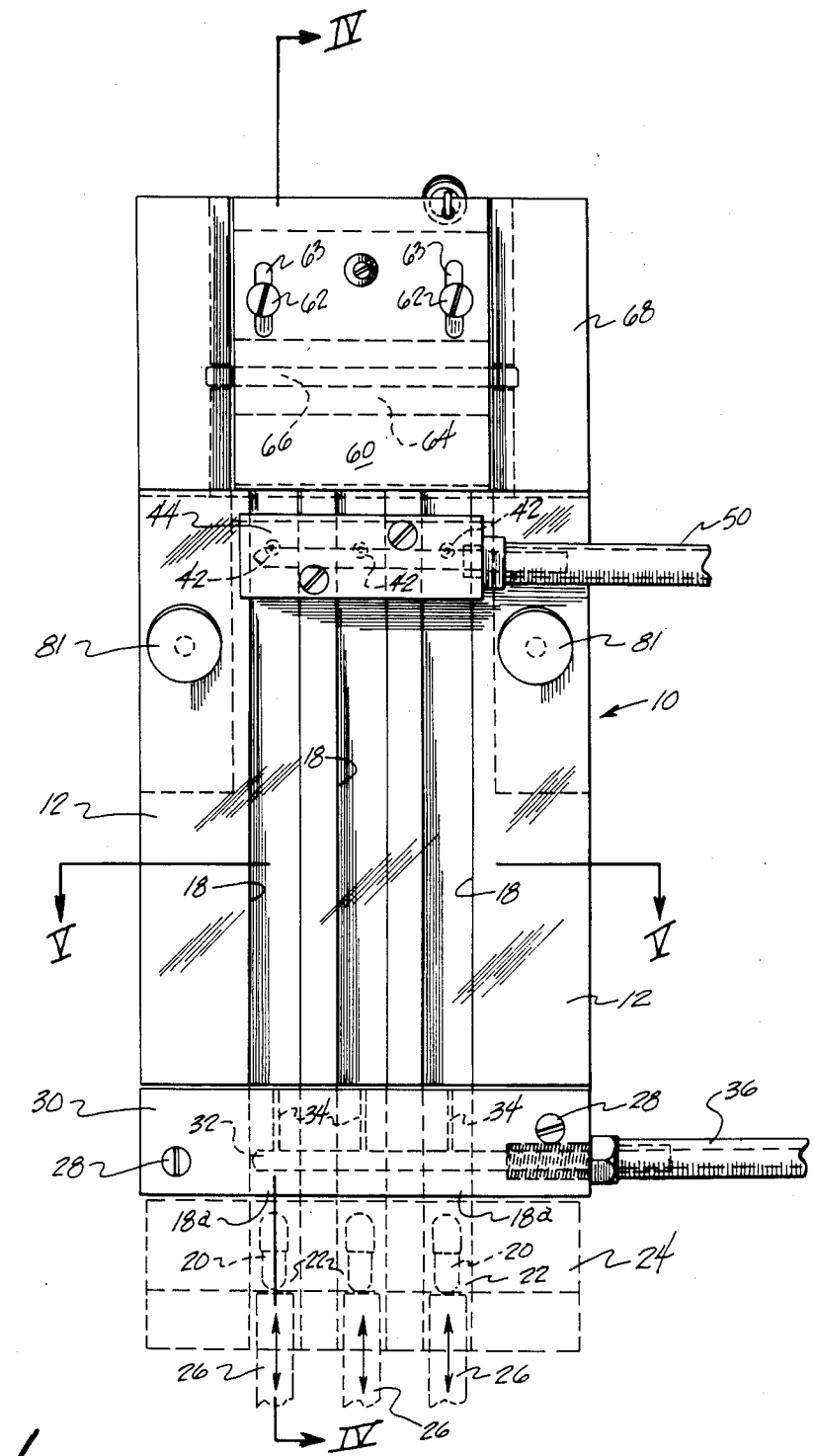
FIG. 1 is a front elevation view of a preferred embodiment of a capsule-wetting device of the present invention.

The present invention is directed to method and apparatus utilized in the sealing of medicinally filled gelatin capsules to prevent their cap and body separation to facilitate retention of medication therein, and to facilitate their tamper-resistance prior to ingestion by a patient. Specifically, the method and apparatus comprises the application and use of a wetting device of relatively simple and economical construction which may be supportably attached to or located adjacent a conventional capsule-filling machine, typically of the intermittent motion discharge type, to receive individual capsules discharged therefrom and to pneumatically convey the same through one or more capsule-conveying passageways to a predetermined wetting position therein wherein the individual capsules, disposed in generally cap-upright position, are subjected to a metered amount of a wetting fluid applied against the side wall of the body of the capsule adjacent the seam of juncture of the side wall of its body and cap to distribute wetting fluid by capillary action into the area between the telescoped side walls of the cap and body. The individual capsules are thereafter released for further conveyance by the pneumatic pressure means to a point of collection or further treatment in the capsule-sealing operation.

PREFERRED EMBODIMENTS OF THE INVENTION

Referring more specifically to the drawings, FIGS. 1–5 depict a preferred embodiment of a capsule-wetting device 10 of the present invention which comprises a generally rectangular block of suitable rigid material, such as transparent plastic 12. As seen, bored through the transparent plastic block 12 are three generally parallel spaced passageways 18 of generally round cross-sectional configuration (FIG. 5) for receipt and conveyance of filled medicinal capsules 20 (FIGS. 3 and 4) for application of suitable wetting fluid between the overlapping cap and body walls of the capsules to serve as a sealing agent in a capsule-sealing operation. The three passageways 18 extend generally upwardly (FIGS. 1 and 4) for the transportation of a plurality of medicinally filled capsules 20 which are delivered into the lower inlet 18a of each capsule passageway from a conventional capsule-filling machine, such as an H & K Capsule-Filling Machine, Model GKF400L, manufactured by Hoflinger and Karg, Robert Bosch gmbH, of Waiblingen, West Germany. Such a capsule-filling machine is well-known and commercially used in the art to fill gelatin capsules with medicinal compositions, such a liquid, solid, or powder, or combinations thereof.

Figure 3:
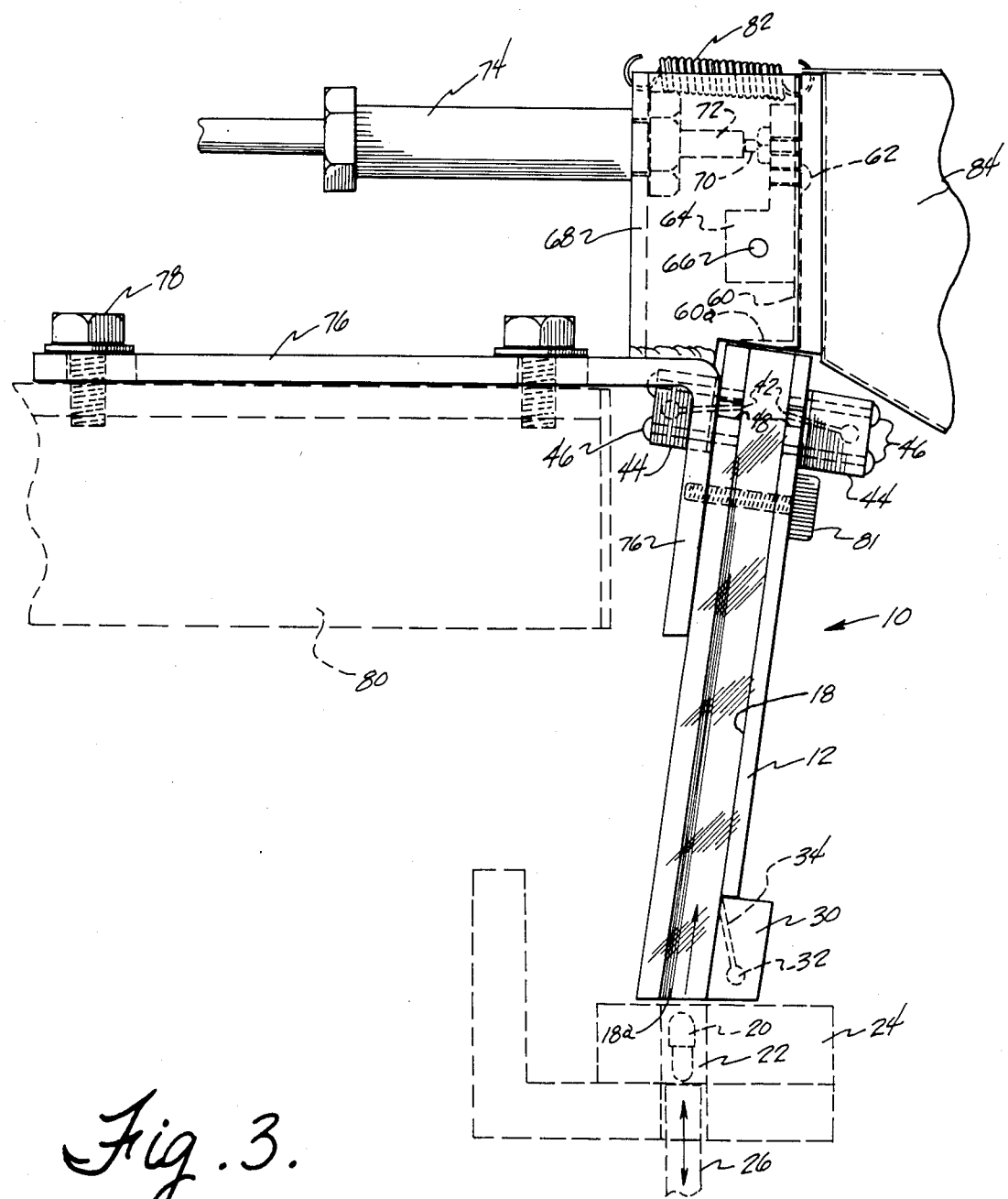
FIG. 3 is a left-side elevation view of the device of FIG. 1, with portions in phantom, and showing its mounting to supporting elements of a capsule-filling machine, and further showing a portion of a discharge chute attached to the device for receiving wetted capsules discharged from the device for further delivery to drying apparatus.
Figure 4:
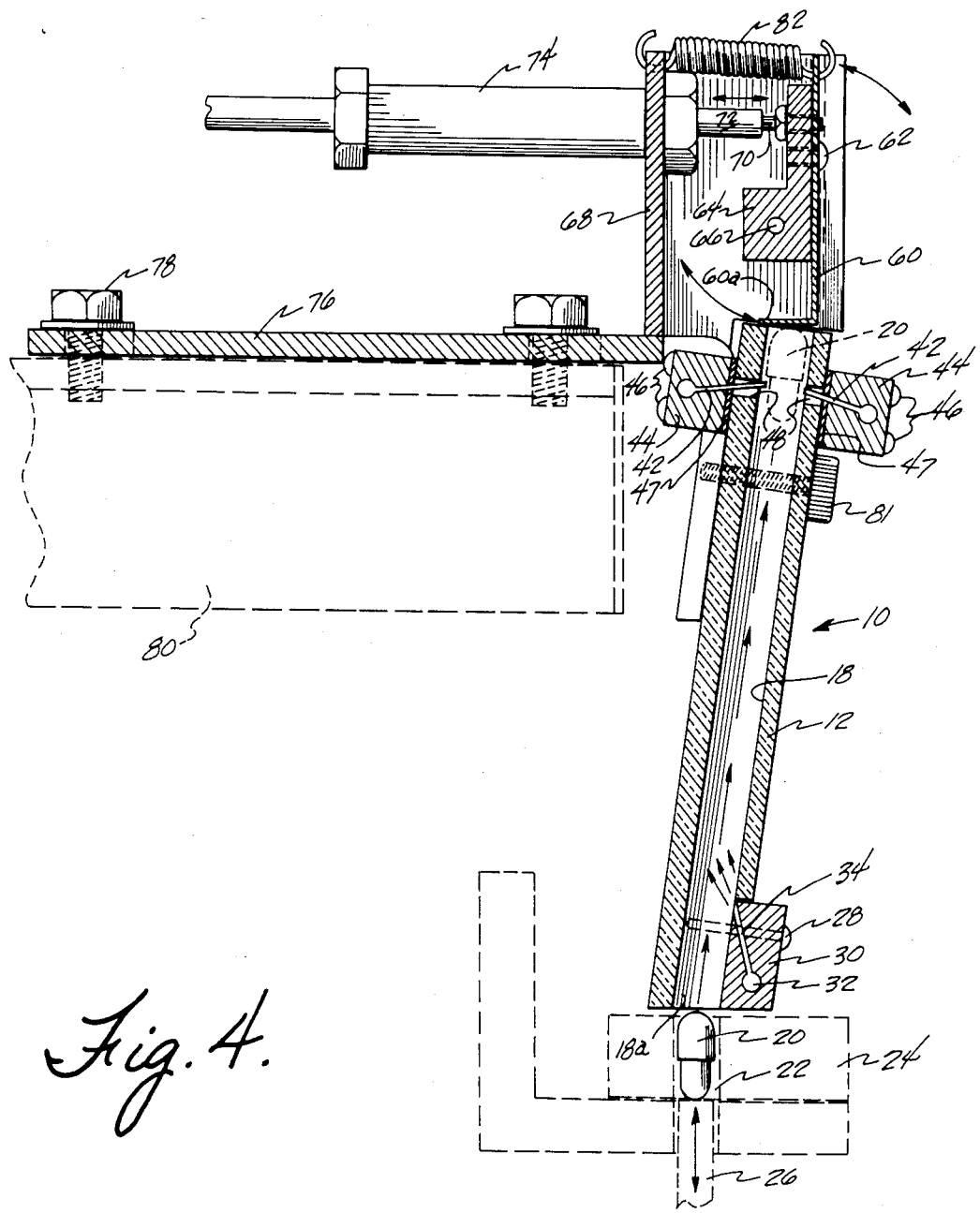
FIG. 4 is a vertical cross-sectional elevation view of the wetting device of FIG. 1, taken generally along line IV—IV thereof and looking in the direction of the arrows.
Figure 5:
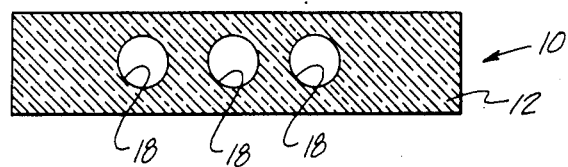
FIG. 5 is a horizontal cross-sectional view of the wetting device of FIG. 1, taken generally along line V—V thereof and looking in the direction of the arrows.

Such an H & K filling machine is typically programmed and operated to intermittently simultaneously discharge one or more filled capsules 20, in periodic sequence, from capsule-containing compartments 22 (FIGS. 1 and 3) located in movable raceway elements 24 of the machine. Groups of capsules 20 are discharged intermittently from their carrying compartments 22 in an upward direction for subsequent handling and collection for further processing. FIGS. 1, 3, and 4 of the drawings show a raceway capsule-containing discharge element 24 of the H & K machine, in broken lines, with three filled capsules positioned for simultaneous upward discharge from their capsule-containing chambers 22 in the raceway element by vertically reciprocable plungers 26 operated by cams (not shown) and suitable program means of the machine. The construction, operation, and control of the intermittent discharge H & K-type capsule-filling machine is conventional, well-known in the art, and forms no part of the present invention.

As heretofore mentioned, it is highly desirable to effectively seal the cap and body portions of medicinally filled gelatin capsules, not only to prevent undesired leakage of the contents therefrom, but to prevent their separation and facilitate their tamper-resistance after manufacture and before use. For this purpose, it is heretofore been proposed to treat the capsules with a suitable fluid wetting agent, such as a liquid composition of water and alcohol, to locate the wetting agent between the overlapping sidewalls of the cap and body of the capsule. The wetting agent acts as a melting-point-lowering liquid for bonding of the cap and body portions together during a subsequent drying and heating operation. Heretofore, such wetting agents have typically been applied to the filled capsules by immersion or saturation of the entire capsules with the melting-point-lowering liquid followed by excess liquid removal and drying, with the aforementioned disadvantages thereof in the sealing process. It has also been generally suggested to spray the wetting liquid on the capsule adjacent the seam of the cap and body portions to apply the same thereto, as generally disclosed in U.S. Pat. No. 4,656,066, aforementioned.

In accordance with the method and apparatus of the present invention, the wetting device 10 shown in FIGS. 1–5 of the drawings may be suitably attached directly to a capsule-filling machine, such as an H & K machine as heretofore described, with the capsule-conveying passageway inlets 18a of the device located immediately above the capsule-discharge outlets of the filling-machine capsule compartments 22, such that actuation of the discharge plungers 26 of the machine push the capsules 20 (illustrated in FIG. 1 as 3 capsules being simultaneously discharged) into the lower portions of the wetting device passageways 18.

As best seen in FIGS. 1, 3, and 4, located adjacent the lower ends of the passageways 18 and secured in a front recessed surface of block 12 by fastening means, such as screws 28, is a generally elongated metal block 30 having a transverse tubular passageway forming a manifold 32 communicating by three smaller passageways 34 with the interior of each of the capsule passageways 18. Manifold 32 is connected at one end by a flexible conduit 36 (FIG. 1) to a source of compressed air, such as an air compressor 100 (FIG. 8), which delivers pressurized air through suitable valves and control lines to manifold 32, lines 34, and upwardly into the capsule-conveying passageways 18 of the wetting device to create a pressure differential in the capsule passageways for conveyance of capsules from the lower end of the passageways to their upper ends, as will be explained.

As best seen in FIGS. 1, 3, and 4, located adjacent the upper end of each of the capsule-conveying passageways 18 of the wetting device 10 are fluid applicator means, shown as two sets of three hollow needles 42, or flexible tubes, each set of which is supportably attached to an elongate block 44 and communicates with a fluid supply manifold formed in the block. Each block 44 is secured by bolts 46 to opposite faces of the plastic block 12 and sealed thereto by gaskets 47. The outer ends of the needles 42 extend through slightly larger holes 48 (FIGS. 3 and 4) in opposed side walls of the plastic block 12 to communicate with respective upper ends of the wetting device passageways 18.

Figure 6:
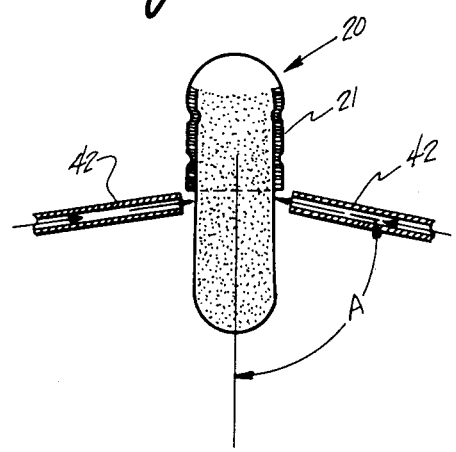
FIG. 6 is an enlarged schematic representation of a single medicinal capsule which may be wetted with a suitable liquid for sealing the cap and body portions of the capsule in accordance with the wetting device of the present invention, and indicating the general construction of the capsule and positional arrangement of the fluid wetting agent-applying needles or tubes relative to the position of the capsule at wetting position during the wetting operation.
Figure 7:
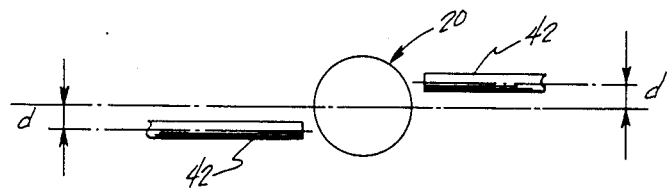
FIG. 7 is a top plan view of FIG. 6, showing the parallel, off-set axial alignment of an opposed pair of wetting agent-applying needles of the wetting device of the embodiment of FIGS. 1-5.

As seen in FIGS. 6 and 7, the needles 42 of one set are parallel to and extend in opposite direction to the needles 42 of the opposite set. Opposite pairs of needles of each set are off-set from opposite sides of a center diameter d of each medicinal capsule 20 by a distance d (FIG. 7) so that the metered streams therefrom initially contact the opposite side of the central diameter of the capsule body to facilitate distribution of liquid migration between the overlapping cap and body walls.

Figure 8:
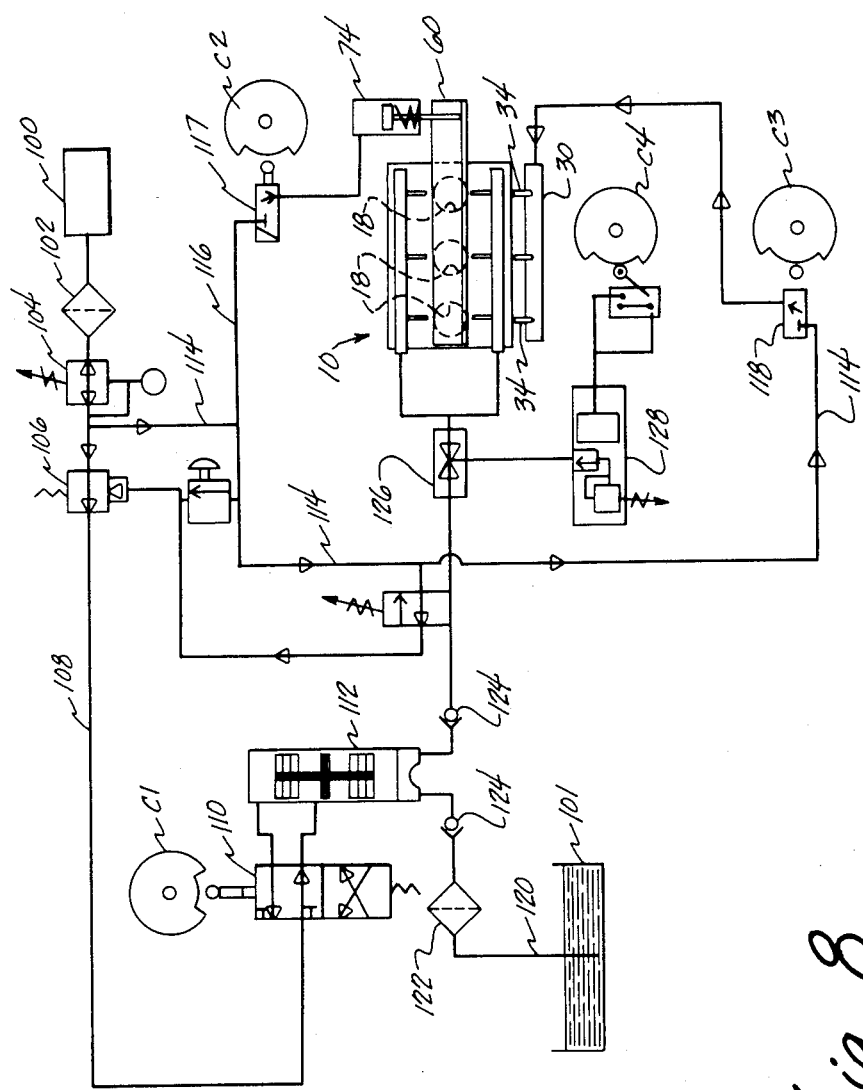
FIG. 8 is a diagramatic drawing showing generally the control elements and circuitry for operation of the capsule-wetting device of the present invention, as the sequence of operation thereof may be programmed by cams synchronized with the operation of a commercially-available and conventional capsule-filling machine.

Each of the manifolds supplying wetting fluid, such as a melting-point-lowering liquid (e.g., alcohol and water solution), is connected by flexible conduits 50 (FIG. 1) in suitable fashion through valve and control means to a source of wetting liquid, as a reservoir indicated at 101 in FIG. 8. Details of the operation and sequence of application of the wetting liquid in the wetting cycle operation will be explained hereinafter.

As best seen in FIG. 4, the manifold blocks 44 and their sets of needles 42 are mounted to direct wetting fluid against a capsule body 20 held in blocked position at a predetermined location at the top of each passageway 18. As best illustrated in FIGS. 4, 6, and 7, the wetting streams are directed by the needles at an acute angle A of approximately 80° to the longitudinal axis of the capsule in the direction of the capsule cap 21 and movement of the capsule through the passageway. The longitudinal axes of the needles 42 are disposed at an acute angle directed toward the passageway outlets. The discharge outlets of the wetting liquid needles 42 also are positioned on opposite sides of the diameter of the blocked capsules by a distance d to direct wetting liquid against and around the side walls of the capsule body at a point just below the juncture of the cap and body of the capsule, to facilitate transfer of the wetting liquid by capillary action upwardly between the overlapping cap and body walls.

Figure 2:
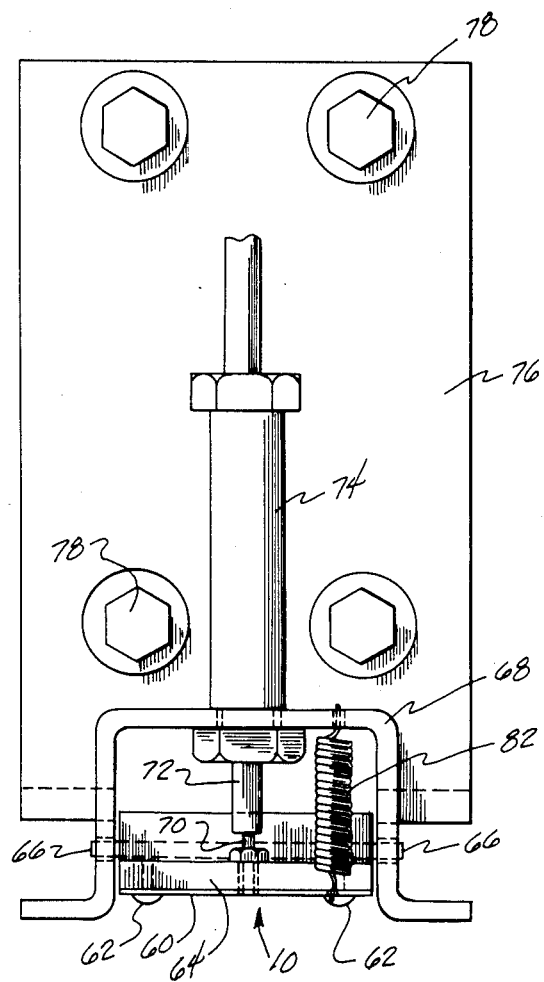
FIG. 2 is a top plan view showing only the upper portion of the wetting device of FIG. 1, as it is mounted on a support plate.

Positioned adjacent the upper discharge outlets of each of the three passageways 18 of the wetting device, as best seen in FIGS. 1, 2, and 4, is a generally J-shaped (in FIG. 4) plate 60, the lower arm, or limb 60a, of which is normally disposed to substantially block the three passageway discharge outlets when the plate is positioned as shown in FIG. 4. Plate 60 is mounted for vertical adjustment by means of screws 62 which reside in grooves 63 (FIG. 1) of the plate and adjustably secure plates 60 to a pivot block 64, the lower portion of which is pivotally attached by a pivot pin 66 to a support bracket 68 of generally inverted U-shaped configuration, as seen in FIG. 2. The upper end of pivot block 64 has an adjustable bolt 70 with lock nut which operatively engages the plunger element 72 of a pneumatic piston and cylinder 74 which is mounted on support bracket 68. Bracket 68 is in turn attached by suitable means, as by welding, to a support plate 76 fastened by bolts 78 to a suitable support surface 80 of the capsule-filling machine (shown in dashed lines in FIGS. 3–5 of the drawings). The plastic block 12 of wetting device 10 also is attached by threaded bolts 81 to portions of support plate 76 and thus is supported on the superstructure of the capsule-filling machine to receive filled capsules into its capsule-conveying passageways as they are discharged from compartments 22 by action of the plungers 26 of the machine.

The pneumatic piston and cylinder 74 is a conventional single-acting type and is positioned and operated to pivot the block 64 and its stop plate 60 in programmed manner about pivot pin 66 in the direction of the arrow, as shown in FIG. 4, to periodically release each medicinal capsule from the wetting location at the top of each capsule passageway 18 after application of wetting fluid, as will be explained. A spring member 82 attached to the support bracket 68 and J-shaped stop plate 60 returns the stop plate, after pneumatic displacement, to a closure position blocking the outlet of each of the capsule passageways 18 of the wetting device.

In operation, medicinally filled gelatin capsules 20 ejected from the capsule-containing compartments 22 of the capsule-filling machine by the ejector plungers 26 simultaneously move into the lower end of each capsule passageway 18 of the wetting device. Pressurized air emitted into the lower ends of the passageways through the manifold 32 and air discharge conduits 34 propels and conveys each capsule in its respective passageway to the upper end thereof where it is stopped at the wetting position or location by stop plate portion 60a (note FIG. 4). Upon arrival of the capsules at the wetting positions, a predetermined, metered amount of wetting agent, such as a water/ethanol solution, is ejected against the opposed side wall portions of the capsule 20 on opposite sides of the central diameter just below the seam of the cap and body of the capsule (note FIGS. 7 and 8). Capillary action causes the wetting liquid to flow around and upwardly between the overlapping side walls of the cap and body. By controlling the precise amount of wetting liquid ejected by the opposed needles 42 against opposite side wall portions of each capsule, a sufficient amount of wetting liquid can be applied to wet the interfacial area of overlap of the capsule body and cap without excessively wetting or oversaturating the rest of the capsule with the liquid wetting agent. In addition, pressurized air passing through the capsule-conveying passageways 18 assists in upward capillary flow of the wetting liquid between the side walls of the capsules and in removing any excess liquid which may be applied thereto during the wetting liquid application.

The exact position of the capsules in the passageway wetting locations, e.g., the location of the capsule cap and body seam relative to the wetting needle outlets, may be adjusted for capsules of varying length by vertical adjustment of stop plate 60 along slots 63 with screws 62.

Immediately after the metered amount of wetting liquid is located between the side walls of the cap and body of the capsules at the wetting position, pneumatic piston and cylinder 74 of the wetting device is actuated to pivot the capsule stop plate 60 in a clockwise direction, as indicated by the arrow in FIG. 4, and thereby unblock the passage of capsules from the upper discharge outlets of the capsule passageways 18. As seen in FIG. 3, attached to support bracket 68 of the wetting device 10 is a discharge chute 84, comprising a downwardly directed U-shaped metal trough (the upper portion of which is shown in FIG. 3) which receives and gravitationally conveys the wetted capsules to a further collection or treatment station, such as the inlet of a capsule-heating device (not shown). Capsule heating may be accomplished in various ways. The heating equipment may comprise various conveying means with a source of heated air to raise the temperature of the wetted capsules, during their conveyance, a sufficient amount to ensure a final fusion and seal of the caps and bodies to prevent their separation.

Equipment which may be employed to control and sequentially operate the wetting device 10 of the capsule-sealing apparatus of the present invention in connection with an intermittent discharge capsule-filling machine (such as the H & K machine) is shown in FIG. 8. The equipment may be operatively connected to the capsule-filling machine and its capsule-discharge elements for programmed actuation. FIG. 8 illustrates diagramatically typical components which may be employed to sequentially operate, through pneumatic control, the wetting device 10 of the present invention. As best seen in FIG. 8, pressurized air from air compressor 100 is supplied to operate pneumatic control elements of the wetting device, as well as to supply pressurized air for conveyance of medicinally filled capsules through the passageways 18 of the wetting device. Pressurized air from compressor 100 passes by way of an air filter 102 through an air regulator valve 104, an air solenoid valve 106, and air conduit line 108 to operate a pneumatically operated switching valve 110, such as a 750 V diaphragm valve manufactured by Electron Fusion Device, Inc. of East Providence, Rhode Island. Switching valve 110 is connected by a cam member C1 to operate sequentially from the H & K capsule-filling machine to in turn operate an air-operated positive displacement liquid pump 112, such as a SV670 pump manufactured by Valcor Scientific Division of Valcor Engineering Corp. of Springfield, New Jersey.

Pressurized air is also supplied via air conduit line 114 to supply conveying air into the lower end of each of the capsule-conveying passageways 18 through manifold block 30 and conduits 34, and to supply operating air via conduit 116 to the pneumatic piston and cylinder 74 for operation of the capsule blocking and releasing plate 60 at the top of the capsule-conveying passageways 18 of the wetting device. Pneumatic valves 117, 118 located in the air supply conduits 114, 116 are operated by suitable cam controls C2, C3 connected to the H & K filling machine to supply air to the capsule-conveying passageways 18 and blocking plate 60 in sequence with discharge of filled capsules 20 from the capsule-filling machine compartments 22.

Wetting liquid, such as a water/ethanol solution, is provided from wetting liquid reservoir 101 which is connected by a conduit 120 and liquid filter 122 to the air-operated liquid pump 112 which has one-way check valves 124 located on inlet and outlet sides of the pump to deliver a metered amount of wetting liquid via needle valve 126 to the wetting manifold block 44 and needles 42 at the wetting position at the top of each of the capsule-conveying passageways 18. Wetting liquid is supplied in sequence to the applicator needles 42 through needle valve 126 which is operated by a liquid injection control timer and regulator 128, such as a 1OOOXLE dispenser manufactured by Electron Fusion Device, Inc. of East Providence, Rhode Island which is sequenced from a cam C4 connected to the H & K machine. Thus, metered amounts of wetting liquid are ejected against the capsules as they are held at the wetting position at the tops of each of the capsule-conveying passageways 18.

Figure 9:
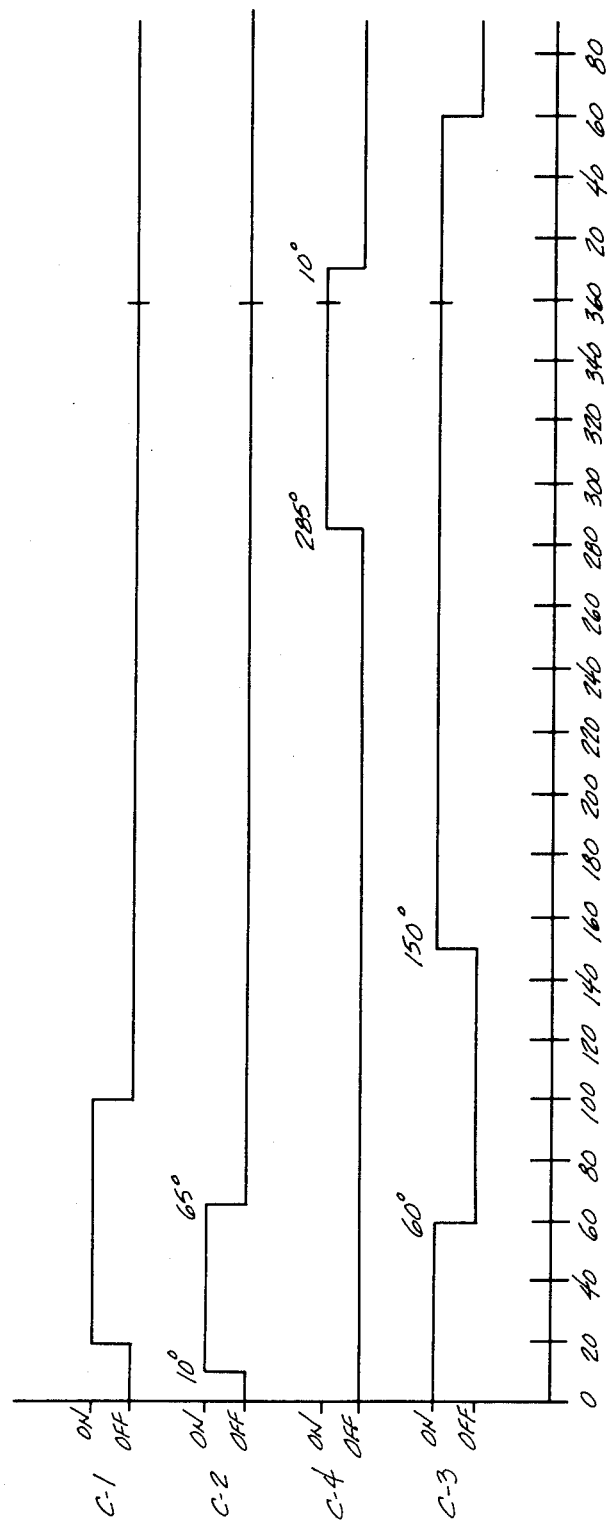
FIG. 9 is a diagramatic drawing, illustrating in a 360° cycle of discharge of one round of filled capsules from a capsule-filling machine, the timing sequence of operation of the wetting device of the present invention for pneumatically conveying and applying a wetting fluid to the overlapping capsule cap and body portions of each conveyed capsule discharged from the capsule-filling machine.

As can be appreciated, and in particular in reference to FIG. 9, during each cycle of discharge of filled capsules from the capsule-filling machine, e.g., each 360° cycle of operation, pressurized air is supplied during the indicated air "on" period of line C3 to the lower portions of each passageway 18 to propel or convey capsules 20 discharged from the capsule-filling machine to the tops of the passageways 18 and the wetting positions located thereat. The capsule stop plate 60 is positioned by spring 82 so that each capsule, with its cap in upwardly disposed position, is blocked, or stopped, during the air "off" period of line C2, with the seam of the cap and body of each capsule positioned just adjacent and above the discharge outlets of the wetting needles 42.

As the capsules are held in proper position in generally upright configuration by the flow of pressurized conveying air through the passageways and the stop plate 60, a metered amount of wetting liquid is pumped by pump 112 during the "on" period of line C1, and is discharged against the side walls of the capsules during the "on" period of line C4. The ejected liquid migrates by capillary action into the space between the overlapping cap and body side walls of each capsule. Depending upon the size of the capsules and the degree of overlap of the caps and bodies thereof, the amount of wetting liquid is preselected to ensure location of sufficient wetting liquid between the overlapping side walls without application of excess liquid onto the capsule outer body.

After application of the wetting liquid to the capsules at the wetting position, air is supplied from the cam control of the capsule-filling machine to actuate the piston and cylinder 74 of stop plate 60 (during the "on" period of line C2) and pivot plate 60 out of the way to release the capsules for ejection and subsequent gravitational discharge through the attached discharge chute 84 to a heating device of the capsule-sealing equipment.

Typically, as previously stated, the capsule-heating device may consist of commercially available components, such as a conveyor equipped with a heated air source to complete reaction of the wetting liquid and fusion seal of the gelatin overlapping side wall portions of the capsules under elevated temperatures, such as temperatures of between about 35° to 80° C.

Figure 10:
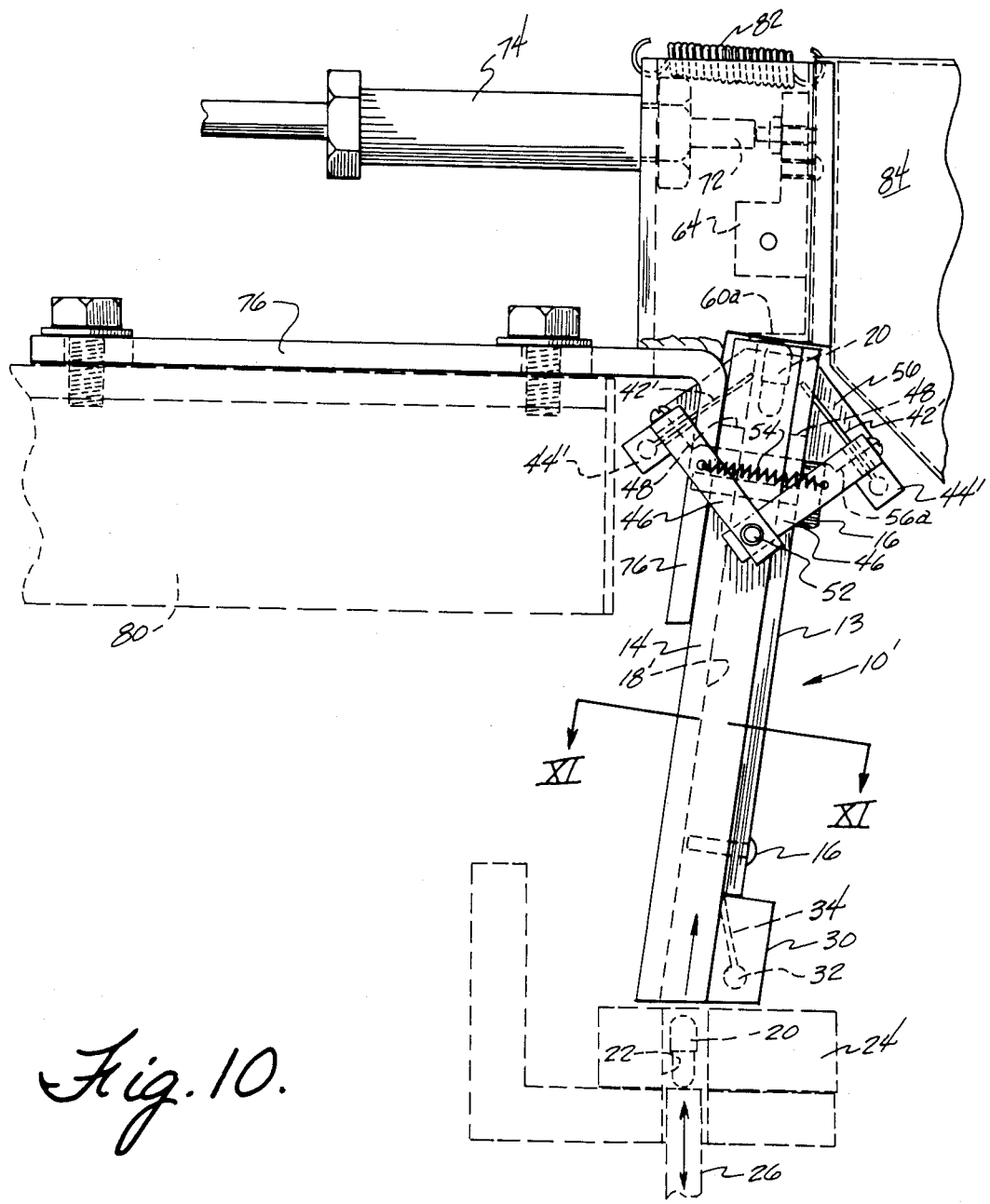
FIG. 10 is a side elevation view of a second embodiment of the capsule-wetting device of the present invention.
Figure 11:
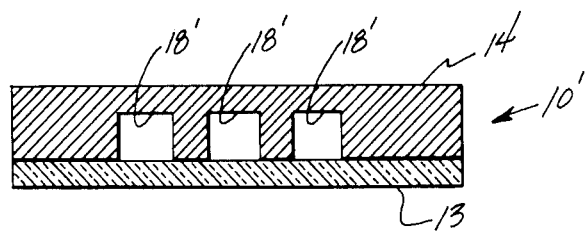
FIG. 11 is a horizontal cross-sectional view of the wetting device of FIG. 10, taken along line XI—XI of FIG. 10, looking in the direction of the arrows.

FIGS. 10 and 11 show a modified form, or second embodiment, of capsule-wetting device, 10', of the present invention which is attached to a capsule-filling machine and operated in the same manner as heretofore described in reference to the wetting device embodiment 10 shown in FIGS. 1-9. The same numbers are used in identification of like parts in FIGS. 1-9 and in FIGS. 10 and 11. The wetting device 10' comprises front and rear rigid plates 13, 14 made of suitable material, such as transparent plastic and metal, respectively, secured by fastening means, such as bolts 16. Plates 13, 14 together form three generally parallel spaced passageways 18' (FIG. 11) of generally square cross-sectional configuration for receipt and conveyance of filled medicinal capsules 20 to the predetermined wetting position at the upper end portions of the passageways. As best seen in FIG. 11, rear plate 14, which may be formed of aluminum, is formed with three spaced parallel grooves of square cross-sectional shape closed by the transparent plastic front plate 13.

Passageways 18' of the modified form of wetting device 10' are connected adjacent their lower inlets to air manifold block 30 having an air manifold 32 and air passageways 34 which supply pressurized air to create a differential pressure in passageways 18' and thus propel and convey gelatin capsules upwardly to the predetermined wetting positions located at the tops of the passageways 18'.

Located adjacent the passageway wetting positions are fluid applicator means which comprise two sets of three opposed hollow needles 42', or flexible tubes. Only two needles (one from each set) are seen in the side view of FIG. 10. Each set of three needles is supportably attached to an elongate manifold block 44' and communicates with a fluid supply manifold in the elongate block. Each block 44' is supportably mounted at each end on a pivotable support arm 46, two of which are shown in FIG. 10. Pivot arm pairs 46 at adjacent ends of blocks 44' are attached by a pivot pin 52 to the adjacent side wall of rear plate 14 of the device. Two arms 46 at one end of blocks 44' are interconnected by a spring 54 which urges the arms 46, manifold blocks 44', and their needles 42' inwardly toward the longitudinal axis of capsule passageways 18'. The discharge, or outlet, ends of needles 42' extend through respective elongate slots 48 in opposed side walls of the upper end of the wetting device passageways 18', with the discharge ends of needles of one set opposed in 180° relation and directly opposite the other set. The ends of opposed pairs of needles 42' are thus located on opposite sides of each medicinal capsule 20 and may directly engage side wall portions of the capsule when in wetting position to direct fluid within the overlapping side walls of the cap and body, as heretofore described.

A polygonally shaped bracket 56, mounted by suitable fastening means on one side of the rear plate 14 of the wetting device, has eared, or flanged, portions 56a which serve as stop members to limit inward pivotal movement of the sets of wetting needles.

The wetting device embodiment of FIGS. 10 and 11 is programmed to operate with control means as described in the reference to the FIG. 1–9 embodiments.

That which is claimed is:

1. Improved apparatus for use in sealing gelatin capsules each having a generally cylindrical cap and body arranged with the side wall of the body telescopically received within the side wall of the cap to contain a medicament therein, comprising means defining a tubular passageway for conveyance of capsules therethrough, means associated with the passageway-defining means for producing a pneumatic pressure differential in the passageway to convey a capsule therethrough, blocking means associated with the passageway-defining means for temporarily stopping the passage of a capsule through the passageway at a predetermined location therein, and applicator means associated with said passageway-defining means and having a discharge outlet located adjacent said predetermined passageway location for applying a metered amount of a wetting fluid against the side wall of the body of a stopped capsule adjacent the seam of juncture of the side walls of its body and cap to distribute wetting fluid by capillary action into the area between the telescoped walls of the cap and body.

2. Apparatus as defined in claim 1 wherein said blocking means includes means for releasing the capsule after wetting for further conveyance by said pneumatic pressure-differential-producing means.

3. Apparatus as defined in claim 1 or 2 wherein said passageway-defining means further defines a passageway inlet and outlet for receipt and discharge of capsules, and a passageway portion at said predetermined location to position a capsule thereat in a generally vertical, cap-up position for receipt of wetting fluid from said wetting fluid applicator means.

4. Apparatus as defined in claim 1 or 2 wherein said tubular passageway-defining means defines a passageway inlet and outlet for receipt and discharge of capsules, means for communicating said passageway inlet with the filled capsule discharge outlet of a capsule-filling machine to receive filled capsules for conveyance through the passageway, said pneumatic pressure differential-producing means comprising an air inlet in the passageway between the passageway inlet and outlet for directing pressurized air flow through the passageway toward the outlet for conveying capsules therethrough, and said passageway-defining means including a passageway portion at said predetermined location to dispose a capsule cap-up with its longitudinal axis generally vertical for application of wetting fluid against the side wall of the body thereof.

5. Apparatus as defined in claim 1 or 2 wherein said applicator means includes pump means for delivering a metered amount of wetting fluid through said discharge outlet against the side wall of the body of the capsule.

6. Apparatus as defined in claim 5 wherein said wetting fluid discharge outlet is disposed in the passageway to direct wetting fluid against a capsule body at an acute angle to the longitudinal axis of the capsule and in the direction of the capsule through the cap.

7. Apparatus as defined in claim 5 where said wetting fluid discharge outlet is disposed to direct wetting fluid against a capsule body wall at an acute angle and in the direction of movement of the capsule through its passageway outlet.

8. Apparatus as defined in claim 1 or 2 wherein said blocking means comprises means movable into the path of movement of a capsule through the passageway to abut the leading end of the capsule and stop its movement through the passageway while under influence of pneumatic pressure differential therein.

9. Apparatus as defined in claim 1 or 2 wherein said blocking means includes means operatively associated therewith for attachment to a capsule-filling machine to operate said blocking means in response to discharge of filled capsules from the capsule-filling machine.

10. Apparatus as defined in claim 1 or 2 wherein said tubular passageway-defining means defines a plurality of said passageways with inlets and outlets for receipt and discharge of capsules, said pneumatic pressure differential-producing means comprises an air inlet in each of said passageways between its inlet and outlet for directing pressurized air flow therethrough to convey capsules, and said blocking means is associated with each of said passageways to stop capsules at predetermined locations therein.

11. A method of sealing gelatin capsules each having a generally cylindrical cap and body coaxially arranged with the side wall of the body telescopically received within the side wall of the cap to contain a medicament comprising the steps of:
(a) pneumatically conveying a gelatin capsule in a predetermined path of travel;
(b) temporarily stopping the movement of the capsule in the path with the capsule in a generally vertical, cap-up position;
(c) directing a metered amount of wetting fluid against the side wall of the body of the capsule adjacent the seam of juncture of the side walls of its body and cap to distribute wetting fluid by capillary action into the area between the telescoped walls of the cap and body; and
(d) thereafter pneumatically conveying the capsule in the path to a further location.

12. A method as defined in claim 11 including the further step of thermally treating the wetting fluid-containing capsule to remove fluid therefrom and fuse the overlapping side walls of the cap and body of a capsule to form a unitary structure.

13. A method as defined in claim 11 wherein said capsule is initially conveyed pneumatically in said path of travel from its point of discharge from a capsule-filling machine.

14. A method as defined in claim 11 wherein wetting fluid is directed against the side wall of the body of the capsule in an upwardly directed acute angle to the longitudinal axis of the capsule.

15. A method as defined in claim 11 wherein the wetting fluid is directed against the side wall of the body of the capsule at an acute angle in the direction of the capsule's movement in said path of travel.

* * * * *